UNITED STATES PATENT OFFICE.

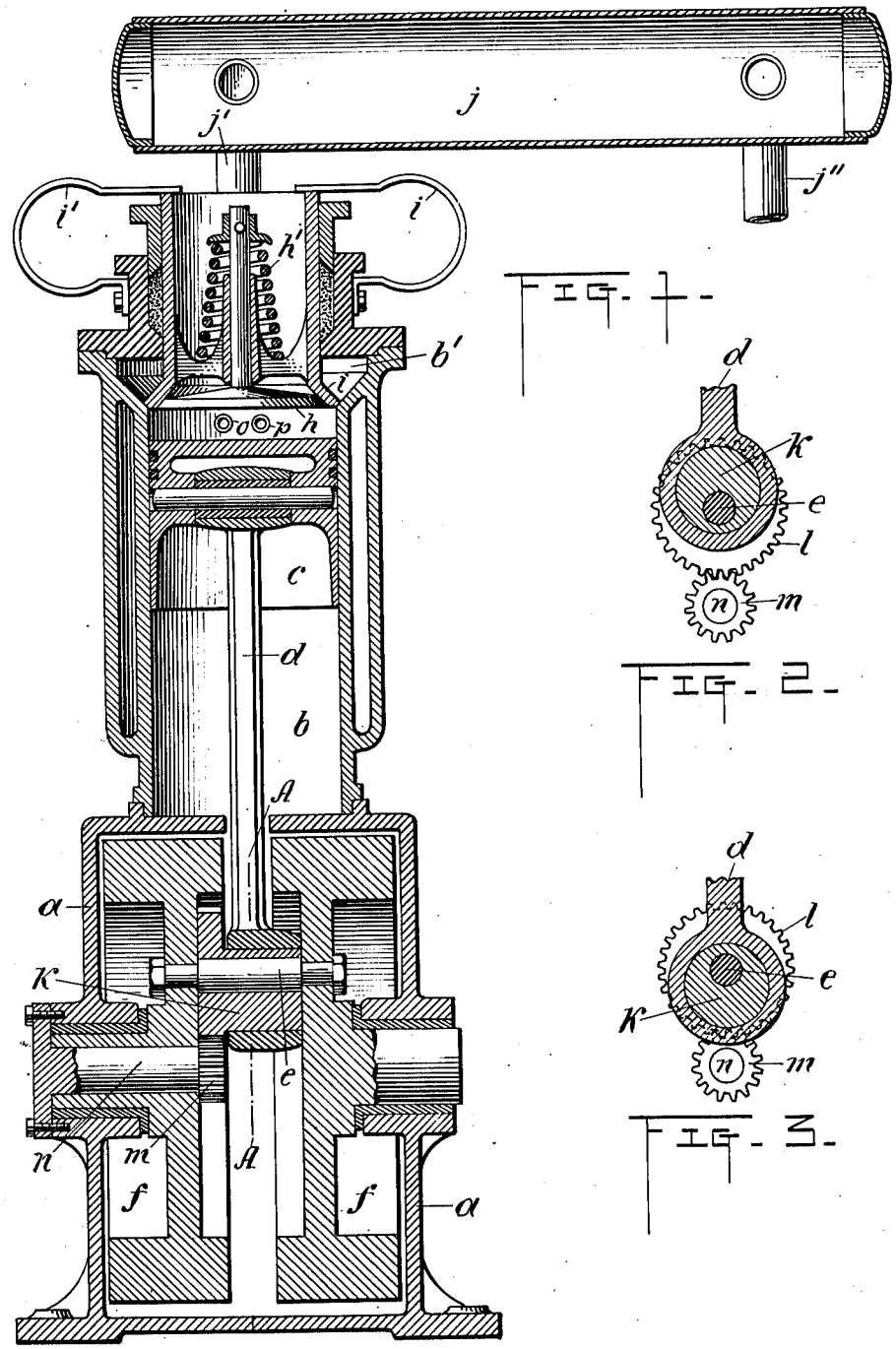

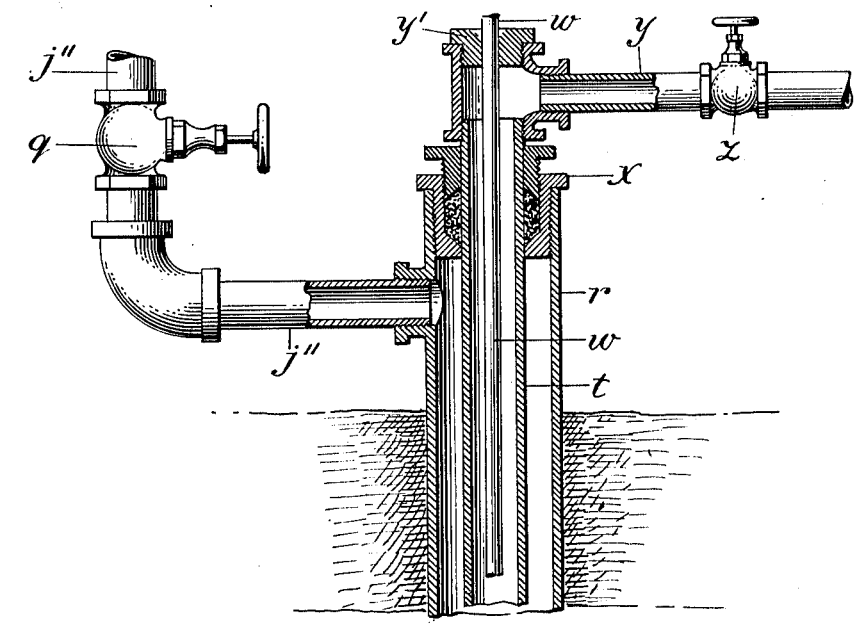
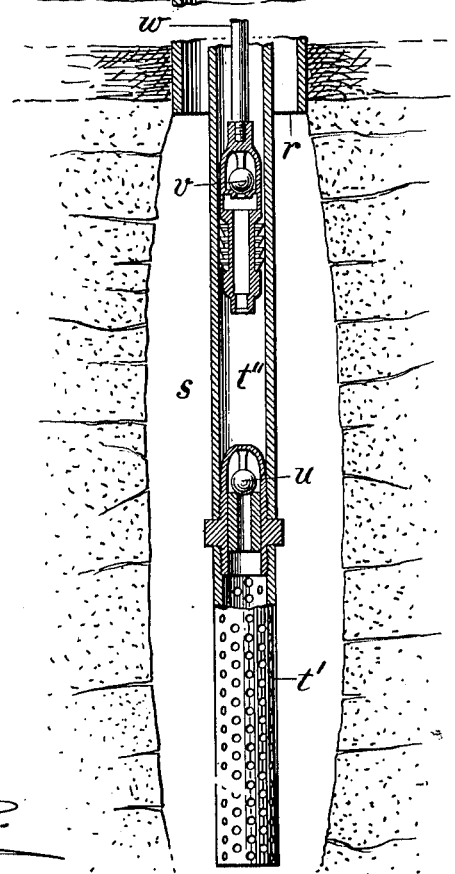

ALFRED P. ELTEN, OF NEW YORK, N. Y., ASSIGNOR TO E. E. BURLINGAME, OF NEW YORK, N. Y.

METHOD OF TREATING OIL-WELLS.

956,058.  Specification of Letters Patent.  Patented Apr. 26, 1910.

Application filed February 13, 1909. Serial No. 477,771.

*To all whom it may concern:*

Be it known that I, ALFRED P. ELTEN, a citizen of the United States, and resident of New York, State of New York, have invented certain new and useful Improvements in Methods of Treating Oil-Wells; and I do hereby declare that the following is a full, clear, and exact description of the invention, such as will enable others skilled in the art to which it appertains to make and use the same, reference being had to the accompanying drawings, which form part of this specification.

This invention relates, principally, to methods of treating wells producing crude oil whose base consists of paraffin, asphaltum or other hydro-carbons that are liable, either through intimate contact with water and air, or otherwise, to saponify, thicken or congeal to such a degree of viscousness as to not only clog the oil-yielding crevices and fissures of the well, and coat the cavity of the latter, but also cause the bore of the pump with its valves, and the well-tubing, to become so contracted by the fatty, hydro-carbonaceous deposits thus forming that the flow of the oil is therethrough materially impeded, and eventually ceases altogether.

The main object of my invention is to be able to at all times, and uninterruptedly, operate oil-wells with a possible maximum of out-put of the oil in its natural and unaffected, or not deteriorated, therefore most advantageous condition; more particularly, to readily bring the more or less viscid residuum or sediment of crude oil or petroleum to the surface together with the comparatively volatile constituents or elements of the same, which I accomplish by suitably subjecting the oil-bearing or productive stratum of the sand-rock formation in close proximity to the well-cavity, through which the oil percolates, to the more or less continued penetrating and searching action of heated, flowing, permanent, neutral gases under pressure, at the same time keeping the oil through its passing up the well-tube to the surface together with these gases at such a temperature as to assure a high degree of fluidity, and preferably while the oil-pump is in operation.

The slow exudation of the oil through the sand-bed, in a large number of wells, may be ascribed to the presence therein of, and continued contact of the oil with, salt-water. The flows and streamlets of the latter and of the oil, varying widely as to relative quantities, in converging toward the openings of the "anchor", are necessarily brought into more or less intimate contact in the porous, limited zone immediately surrounding the well-cavity, or shot-hole, with the result that, due to the thickening action of the salt-water on the oil under certain conditions, the veins and interstices, or seams, of this section become in time partly or wholly gummed-up. To not only open the crevices of the oil-sands, but also to reduce, or if possible altogether remove, this tendency to form obstructing deposits or accumulations of oleaginous matter, or of kindred substances, I generate or provide a suitable working- or heating-medium in the form of a gas, or mixture of gases, at or near the mouth of the well, and force the same, preferably, through the annular space between the casing and the well-tube, into the cavity of the oil-yielding stratum, after having tightly closed the upper end of the said casing through which the well-tube projects, allowing these gases, subsequently, to ascend through the pump and the well-tube, in a heated condition, and to pass from the tube through a valve which is adapted to regulate the pressure of the said gases while in the well, if the pressure of the oil in the well-tube, on the pump-valve due to its head, is less than the pressure of the heated gases in the well-cavity, or if there is no oil in the well-tube. However, since most oil-wells are so deep that the pressure, per square-inch, of the oil-column in the working barrel is considerably greater than the pressure, per square-inch, of the gases in the well-cavity, a valve at or near the upper end of the well-tube then becomes superfluous. From this follows that the heated, compressed gases have a two-fold function; first, they penetrate the oil-yielding stratum, to a considerable depth, thereby creating a heated, spherical zone through which all of the oil must pass to reach the well-cavity; second, these gases, by gradually expanding to atmospheric pressure in ascending with the oil, and subsequently escaping into the atmosphere at the outlet or mouth of the well-tube, are capable of assisting the pump in forcing the oil to the surface, provided suitable pressure relations exist. It is obvious that such an expansion of these gases may be perfect and complete, therefore can occur with a possible maximum of efficiency. At the same time, these gases maintain the oil in the well-tube, until it is discharged therefrom, at such a temperature, and in such a state of fluidity, that any and all tendency to a thickening of the oil is entirely avoided. These gases, being composed of nitrogen and carbon dioxid mainly, with comparatively small, if any, quantities of oxygen and carbon monoxid, it follows that the oil may even be heated to vaporization without detriment since the gaseous medium will not support combustion. Furthermore, the small quantity of water suspended in, and carried by, the gases as steam, remains in that condition, therefore can not affect the oil.

As can readily be perceived, the oil is thus heated with practically permanent and combustion-non-supporting gases, that can not have any deteriorating action on the oil or the paraffin.

By the term "permanent" I wish to be understood as designating a gas or mixture of gases not subject under the conditions obtaining to change of physical state, and as distinguishing from steam, for example, which is subject to condensation and return to the liquid state.

With the foregoing and additional, minor, objects in view, one of a series of plans, constructions or arrangements of parts, that are deemed mechanical equivalents, is hereinafter more specifically described, and illustrated in the accompanying drawings, disclosing therethrough one way in which my method of treating oil-wells may be carried into practice.

In these drawings, in which like characters of reference designate like parts in all of the views, Figure 1 is a vertical, central, longitudinal section of an internal-combustion motor and the receiver for the compressed waste-gases of the same. Fig. 2 is a vertical section, on line A A of Fig. 1, of the variable-stroke device, showing its position at the end of the discharge-stroke, that is, after having expelled all of the waste-gases. Fig. 3 is a vertical section, on line A A of Fig. 1, of the variable-stroke device, showing its position at the end of the compression-stroke and corresponding to the position shown by Fig. 1. Fig. 4 is a vertical, central, longitudinal section, partly in view, of the upper and lower parts of an oil-well and the pumping mechanism.

Referring now to the drawings, Fig. 1 represents internal-combustion apparatus in accordance with my invention, adapted to furnish heated gases that are of a sufficiently permanent and neutral character to be suitable for use in oil-wells, to cause the same to flow freely. This apparatus, or motor (since it may simultaneously furnish power), with its base $a$, cylinder $b$, piston $c$, connecting-rod $d$, crank-pin $e$, crank-wheels $f f$, suction-valve $h$ and discharge-valve $i$ as main parts, differentiates from other heat-engines of this type, principally, in that its piston is arranged to operate with an alternatingly-variable in-stroke, for the purpose of discharging, during the exhaust stroke, practically all of the gaseous waste-products of combustion into a receiver, as $j$, against the pressure maintained therein. To this end a bushing, as $k$, eccentrically-rotatably mounted on crank-pin $e$, is provided with teeth, as $l$, that mesh with the teeth of gear or pinion $m$ whose shank $n$ is immovably secured to base $a$. Bushing $k$ having twice the number of teeth as pinion $m$, it is obvious that by suitably dimensioning connecting-rod $d$ and correspondingly adjusting the eccentricity of bushing $k$ relative to piston $c$, the latter may be caused to move at each alternate instroke (which is to form the exhaust- or discharge-stroke) far enough into the cylinder to contact its head or inner end and thereby, practically, obviate all clearance.

In Fig. 1 the piston is shown at the end of the compression-stroke, (this apparatus operating with a four-stroke cycle) in which position revolving toothed bushing $k$ and stationary pinion $m$ are engaged as shown more clearly in Fig. 3. At, or about, this phase of the cycle ignition of the charge takes place at $o$, the fuel being introduced at $p$, or otherwise. During the compression and following combustion stroke, discharge-valve $i$ is shown to be held to its seat by the pressure of the contents of receiver $j$ plus that of springs $i i$, provided the pressure thus realized is at all times in excess of the pressure in the cylinder. Should, however, the cylinder-pressure, during the operation rise above the receiver-pressure, then discharge-valve $i$ will be forced off its seat and remain open as long as the pressure in the cylinder is greater than that in the receiver, as a consequence of which a corresponding discharge of air, or waste-gases, into the receiver, will take place during that period. The work of this motor thus consists, mainly, in compressing its waste-gases and transferring or forcing the same into a receiver; in other words, this apparatus forms a self-actuating gas-compressor. By suitably proportioning and adjusting the operating parts, however, motive power may be obtained to any desired extent within the capacity of the apparatus, in addition to that part of it which is represented by the energy of the compressed gases.

As is clear from Fig. 1, valves $h$ and $i$, of which the former is held to its seat by spring $h'$, operate automatically, and are shown to form, together, the cylinder-head or -end in such a manner that they may be recurringly-periodically contacted, or lifted, by the closed end of the piston at the end of each discharge-stroke, or alternate in-stroke, to bring about a substantially complete discharge of the waste gases under pressure. In this motor the crank-wheels $f f$ are shown to serve the purpose of fly-wheels, which latter are suitably journaled in base $a$. The compressed gases which thus pass from cylinder $b$ into receiver $j$ through chamber $b'$ and conduit $j'$, are led through suitable conduits and valves, as $j''$ and $q$, respectively, into and down well-casing $r$ to fill well-cavity $s$ and to subsequently pass from there into and up well-tube $t$ through the anchor $t'$ and working-barrel $t''$ of the same. A stuffing-box $x$ closes the top of well-casing $r$, at the same time maintaining well-tube in its position, as shown by Fig. 4, this tube $t$ being provided with an outlet conduit $y$ that may be controlled by a valve, as $z$. A valve, (foot-valve) as $u$, is preferably placed in tube $t$ between anchor $t'$ and working-barrel $t''$, while pump-rod $w$ carries at its lower end valve $v$, (standing-valve), rod $w$ slidably passing through the upper, closed end $y'$ of tube $t$.

Assuming the oil-well shown in Fig. 4 to have ceased to flow freely by reason of the crevices and interstices in the wall of well-cavity $s$ having become clogged, due to the oleaginous coating on the well- or tube-surfaces, the heated gases on passing down casing $r$ and up tube $t$ to leave the latter through a contracted passage in valve $z$ (if tube $t$ does not contain any liquid), first melt any coating that may be on the well- and tube-surfaces and thereby produce a clear passage. Due to the pressure of the heated gases, which in this instance may be controlled by valve $z$, these gases are then capable of penetrating the oil-bearing crevices and cracks and of melting the obstructing deposits, and it is, obviously, merely a matter of subjecting the well with all its passages a sufficient length of time to the influence of gases that possess a suitable degree of heat and pressure to thoroughly heat the well-cavity with its walls to such an extent or radius as to produce a steady flow with maximum capacity.

Should tube $t$ be filled with oil, or sufficiently so that the pressure of the column of oil resting on valve $v$ approximates the pressure of the gases in the well-cavity, then the use of valve $z$ may be dispensed with, since the weight of this column of liquid, whether oil or water, by loading valve $v$ prevents too free an escape of the gases up through the well-tube and thereby maintains a certain pressure in the well-cavity, which is essential to thoroughly penetrate the crevices of the shot-hole. By most suitably selecting the pressure of the heated waste-gases the same may be caused to aid the pump in bringing the oil to the surface in an economical and rational manner, since these gases in coming to the surface with the oil gradually expand to atmospheric pressure, whereby all of the energy in the gases due to pressure is converted into useful work. When utilizing the high-pressure gases for pumping purposes the ordinary pump may be employed as usual, if so desired.

In treating an oil-well according to my invention, the same is closed at the top of the casing and heated, combustion-non-supporting gases are forced into the well-cavity through the casing, thereby also heating the well-tube from without, to subsequently pass to the surface through the well-tube, while maintaining said flowing gases under a suitably high pressure, thus making it possible and practicable to heat the well with its oil-yielding crevices and passages to the surface at such a temperature that any clogging of the same is made impossible. It is also obvious that oil-wells may be treated according to my method without in any way interfering with the pumping apparatus of the same, and that apparatus similar to the one herein described may be permanently used, either in conjunction with existing pumping apparatus or by arranging the internal-combustion apparatus described to operate the pump in addition to furnishing heated combustion-gases under pressure.

The operating parts shown in Fig. 4 are those usually employed with oil-raising apparatus but, obviously, the same may be varied widely in their constructional features without affecting the scope of the invention. The apparatus for producing heated gases of the nature and for the purpose described and shown in Figs. 1, 2 and 3 may also be constructed on different lines and operate in a manner materially deviating from the one shown and described, I therefore do not wish to be confined to the means shown to carry out my method.

Having thus described my invention and in what manner the same may be carried into practice, what I claim is:—

1. The herein described method of treating oil-wells, the same consisting in closing the opening of the well, and forcing a heated, permanent, combustion-non-supporting gaseous medium under pressure into the well about the upper portion of the well-tube, thence along and surrounding the outside of the well-tube for substantially the full length thereof, thus heating the full length of the well-tube from without, into the well-cavity, heating the same and the crevices thereof, and thence up the inside of said well-tube for the full length thereof, thus heating the full length of the well-tube from within.

2. The herein described method of treating oil-wells, the same consisting in closing the opening of the well, and forcing a heated mixture of nitrogen and carbon-dioxid under pressure into the well about the upper portion of the well-tube, thence along and surrounding the outside of the well-tube for substantially the full length thereof, thus heating the full length of the well-tube from without, into the well-cavity, heating the same and the crevices thereof, and thence up the inside of said well-tube for the full length thereof, thus heating the full length of the well-tube from within.

3. The herein described method of treating oil-wells, the same consisting in closing the opening of the well, and forcing a heated, permanent, combustion-non-supporting gaseous medium under pressure into the well about the upper portion of the well-tube, thence along and surrounding the outside of the well-tube for substantially the full length thereof, thus heating the full length of the tube from without, into the well-cavity, heating the same and the crevices thereof, and thence up the inside of said well-tube for substantially the full length thereof, thus heating the full length of the well-tube from within, and regulating the outflow of said medium from said tube.

4. The herein described method of treating oil-wells having customary well-tubes and plungers and pump-rods therein, liquefying the congealed matter in the passages thereof without removing or interfering with such pumping apparatus, the same consisting in closing the opening of the well, and forcing a heated, permanent, combustion-non-supporting gaseous medium under pressure into the well about the upper portion of the well-tube, thence along and surrounding the outside of the well-tube for substantially the full length thereof, thus heating the full length of the well-tube from without, into the well-cavity, heating the same and the crevices thereof, and thence up the inside of said well-tube for the full length thereof, thus heating the full length of the well-tube from within.

In testimony whereof, I affix my signature, this 10th day of February, 1909, in the presence of two witnesses.

ALFRED P. ELTEN.

Witnesses:
C. H. McIntyre,
L. A. Borden.